Patented Aug. 17, 1926.  1,596,586

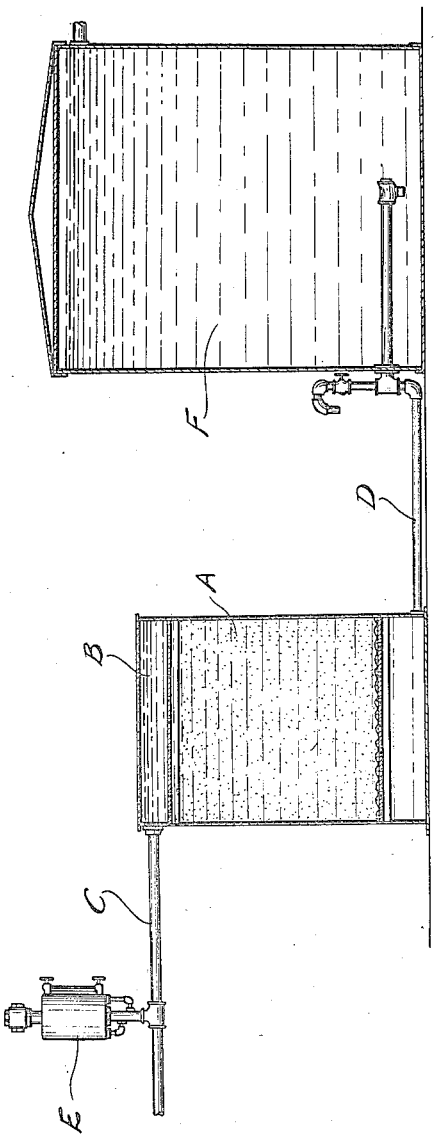

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING WATER IN OIL EMULSIONS.

Application filed December 23, 1924. Serial No. 757,735.

This invention relates to the treatment of emulsions of mineral oil and water, such as petroleum emulsions, for the purpose of separating the oil from the water.

Petroleum emulsions of the kind referred to are commonly known as "cut oil", "roily oil" and "bottom settlings", and consist of oil constituting the continuous phase of the emulsion, droplets of water distributed throughout the body of oil and constituting the dispersed phase, and films of matter that encase the droplets of water.

The conventional process for breaking such emulsions contemplates adding to or mixing with the emulsion a treating agent that will act on the emulsion in such a manner that the water of the emulsion will separate from the oil when the emulsion is allowed to remain in a quiescent state, at a suitable temperature, after treatment. It is my belief that such emulsions can be broken more effectively and with lesser amounts of treating agent if the emulsifying films in which the droplets of water are encased have fissures, gates or openings through which the treating agent can act and through which the droplets of water can escape and thus produce coalescence.

Accordingly, I have devised a process for breaking water in oil emulsions which is characterized by subjecting the emulsion to such action as to produce fissures in the emulsifying films which surround the droplets of water, or to increase the size of existing fissures, whereby the treating agent that is mixed with the emulsion or which is thereafter added to the emulsion, may act on the emulsion more effectively than would be possible if said films were continous or free from fissures.

Any of the various demulsifying agents now used in the treatment of petroleum emulsions can be used in my process and various means can be used for creating fissures in the emulsifying films or increasing the size of existing fissures. I prefer, however, to produce such fissures or enlarge existing fissures in the emulsifying films, by passing the emulsion through a substantially quiescent bed formed by a mass of small, non-absorbent solid particles that are separated from each other by spaces or voids approaching capillary dimensions, so as to cause the oil of the emulsion to spread out over the surface of said particles upon coming in contact with same, and thus exert a tension force on the droplets of water which tends either to create fissures in the films encasing said droplets, or to enlarge any fissures that may exist in said films. Sand is a material that is well adapted for this purpose, on account of the fact that it is capable of being wetted by the oil of such emulsions, the particles of same are solid and non-absorbent, it is inexpensive and easy to obtain in nearly any locality and when combined with a means to produce a substantially quiescent bed, the particles of same are separated by spaces or voids approaching capillary proportions. Various other materials composed of small particles that are non-absorbent and capable of being wetted by the oil of a petroleum emulsion can be used to produce or create fissures in the emulsifying films, and therefore, I do not wish it to be understood that my process is limited to the use of sand. For the purpose of clarity the term "non-absorbent" is herein used in the following sense: If a non-absorbent substance is subjected to the liquids, oil and water, for a period of time and subsequently wiped dry, it is still 100% original material by weight. There is no oil or water on its inner surfaces. If an absorbent material is subjected to the same procedure and wiped dry, it will contain some oil or water on its inner surfaces, and therefore, is no longer 100% original material by weight.

The figure of the drawings is a sectional view of an apparatus that can be used in practicing my process.

Said apparatus, in its simplest form, consists of a layer or bed A of sand or other suitable material composed of small, non-absorbent particles capable of being wetted by the oil of the emulsion, a chamber B inside of which said bed or layer is held in a quiescent state, an inlet pipe C leading to the upper end of said chamber through which the emulsion to be treated is introduced into said chamber at a point above the bed A of non-absorbent particles, and an outlet pipe D leading from the lower end of said chamber through which the emulsion escapes after percolating through the bed A. Any suitable demulsifying agent or treating agent is added to or mixed with the emulsion before it is passed through the bed A, and in the apparatus herein illustrated I have shown a device E on the supply conduit C that holds a treating agent which enters the conduit C and mixes with the emulsion flowing through same before said emulsion reaches the treating chamber B. In passing through the bed A the oil of the emulsion spreads out over the surfaces of the non-absorbent particles constituting said bed, thereby exerting a tension force on the droplets of water in the emulsion which tends either to create fissures in the films surrounding said droplets, or to enlarge any fissures that may exist in said films. Accordingly, the efficiency of the treating agent will be greatly increased, because the films which encase the droplets of water have openings through which the treating agent can act and through which the droplets of water can escape and produce coalescence when the treated emulsion thereafter enters the settling tank F. Gravity, pressure or suction can be used to feed the emulsion through the bed A, and if desired, the flow of the emulsion through said bed can be reversed at intervals so as to remove from the voids or interstices of the bed any particles of foreign matter that may have become lodged in same.

I am aware of the fact that it has heretofore been proposed to pass a water in oil emulsion that contains a treating agent through a mass of excelsior or similar material to cause the treating agent to be distributed uniformly throughout the emulsion, but material like excelsior will not produce fissures in the emulsifying films or enlarge existing fissures, as is contemplated by my invention. I am also aware of the fact that it has been proposed to force an emulsion upwardly through a trough containing a loose bed of sand for the purpose of agglomerating mechanically held water, but such a loose or non-quiescent bed permitting jets to pass upwardly through same, would not produce the results that are attained by a bed of the kind contemplated by my invention because the emulsion in passing through said bed does not pass through voids approaching capillary proportions.

Having thus described my invention, what I claim as new and desire to secure by Letters Patent is:

1. A process for breaking water in oil emulsions, characterized by mixing a demulsifying agent with an emulsion, and bringing the emulsion into engagement with a quiescent mass of small-sized, non-absorbent particles, separated by spaces or voids approaching capillary proportions and capable of being wetted by the oil of the emulsion.

2. A process for breaking water in oil emulsions, characterized by adding a suitable demulsifying agent to such an emulsion, then bringing the emulsion into engagement with a quiescent mass of small-sized, non-absorbent particles separated from each other by voids approaching capillary proportions and capable of being wetted by the oil of the emulsion, and thereafter introducing said emulsion into a settling tank so as to cause the oil and water to separate.

3. A process for breaking water in oil emulsions, characterized by adding a suitable demulsifying agent to such an emulsion and passing said emulsion through a bed of sand held in a quiescent state and composed of small sized particles separated by voids approaching capillary proportions.

MELVIN DE GROOTE.